Feb. 18, 1969 J. M. TYLER 3,428,273
AIRCRAFT LAUNCHING
Filed Jan. 18, 1967 Sheet 1 of 2

INVENTOR
JOHN M. TYLER
BY Melvin Pearson Williams
ATTORNEY

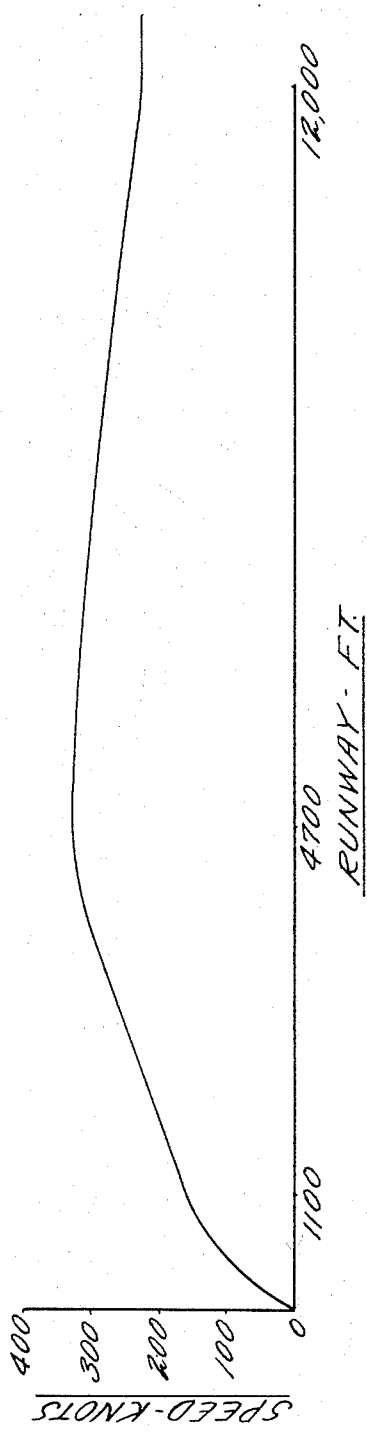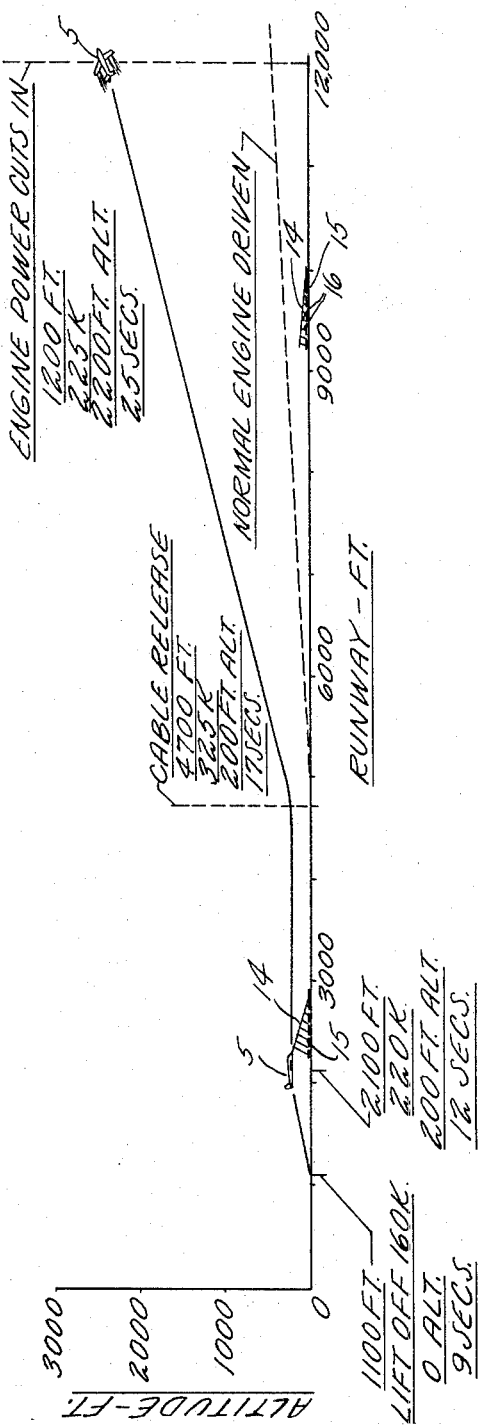

United States Patent Office 3,428,273
Patented Feb. 18, 1969

3,428,273
AIRCRAFT LAUNCHING
John M. Tyler, Glastonbury, Conn., assignor to United Aircraft Corporation, East Hartford, Conn., a corporation of Delaware
Filed Jan. 18, 1967, Ser. No. 610,132
U.S. Cl. 244—63     1 Claim
Int. Cl. B64f 1/06, 1/26; B64d 3/00

ABSTRACT OF THE DISCLOSURE

With its engines idling, an aircraft is towed by a catapult-like device to a speed in excess of liftoff speed and is continued to be towed, while in flight, until sufficient kinetic energy is imparted thereto so as to permit the aircraft, after the tow cable is released, to climb several thousand feet in the air before advancing the aircraft-mounted engines to full thrust, thereby achieving a substantial reduction in aircraft takeoff noise.

CROSS-REFERENCES TO RELATED APPLICATIONS

A source of fluid pressure suitable for use in impelling an aircraft launching piston useful in implementing the present invention is disclosed in a copending application of the same assignee entitled, Aircraft Launching Thrust Augmentation System, filed on even date herewith by John M. Tyler, Frederick D. Havens, Richard C. Hickok and Ernest Feder, Ser. No. 610,129. A cylinder within which aircraft launching apparatus may be impelled in accordance with the present invention is disclosed in another copending application of the same assignee entitled, Floating Pneumatic Thrust Cylinder for Aircraft Launching System, filed on even date herewith by Ernest Feder, John Kransnitski and Peter T. Vercellone, Ser. No. 610,130. One type of seal for the longitudinal slot in the pneumatic thrust cylinder which may be utilized in accordance with the present invention is disclosed in a further copending application of the same assignee entitled, Integral Seal for Aircraft Launching Cylinder, filed on even date herewith by Joseph H. Gehringer and Peter T. Vercellone, Ser. No. 610,093. Another type of seal for the longitudinal slot in the cylinder of an aircraft launching system in accordance with the present invention is disclosed in still another copending application of the same assignee entitled, Modular Seal for Aircraft Launching Cylinder, filed on even date herewith by Ernest Feder, Ser. No. 610,131.

BACKGROUND OF THE INVENTION

Field of invention

This invention relates to ground-powered aircraft launching, and more particularly to a system and method for launching large passenger aircraft with a minimum perceptible noise level on the ground.

Description of the prior art

As jet engines have grown in size from the first engines used in jet transports to the present, takeoff noise at the engine has remained nearly the same or has undergone only a slight reduction. One reason for this is that the use of noise reduction equipment adds additional weight to the aircraft, which in turn requires additional thrust and additional fuel to achieve the additional thrust, thereby mitigating to some degree the effectiveness of such noise reduction equipment. Additionally, as engines become quieter, airplanes become larger and therefore even though ratios of thrust versus noise improve, thrust is increased sufficiently to overcome increased gross weight so that the noise reduction of new aircraft does not reflect the achievement in noise reduction in new engines for large aircraft. The legal and political problems of high noise levels around airports have resulted in the establishment in certain airports of maximum noise limits which airline operators are not permitted to exceed. In many cases, this requires that an aircraft designed to carry a certain payload be operated at a reduced payload in order to permit takeoffs at a specified rate of climb utilizing thrust which results in no greater noise than that specified for the particular airport. Increases in posible gross weight in newer aircraft result in further economic penalties due to the fact that this gross weight is not achievable within the noise limits allowable at many airports.

In order to overcome the aforementioned problems, attempts have been made to attain high climb rates which put the aircraft at such a vertical distance from communities surrounding the airports that the effect of the noise on the ground is mitigated within as short a distance from the airport as possible. Increasing the acceleration of the aircraft by aircraft-mounted means must either take the form of high cost JATO units (which may cost several thousands of dollars per takeoff), or the form of additional burners for increased thrust. However, internal burner equipment on the aircraft to produce minimal thrust involves losses in the engine during rise and therefore mitigates the effect. Additionally, most thrust increasing devices on engines also produce corresponding noise increases, and therefore the problem does not tend toward mitigation, but rather toward aggravation, as a result of the use of these aircraft-mounted takeoff assistance devices.

SUMMARY OF THE INVENTION

An object of the present invention is to provide aircraft takeoff augmentation which substantially reduces the noise level in the area surrounding the airport without excessive economic penalties to commercial airlines using them.

According to the present invention, an airport based launching system accelerates an aircraft with a thrust which is on the same order of magnitude as the thrust normally supplied thereto on takeoff by its own engines, over substantially the same runway distance as would be used by the aircraft during takeoff under the power of its own engines. This action provides a relatively long, nominal acceleration to the aircraft so as to accelerate the aircraft to a velocity in excess of its liftoff velocity, and further accelerate it, while in flight, under tow, to a flight speed which is sufficient so that, when the tow is released, the aircraft may glide at a desired high rate of climb to a relatively high altitude. The aircraft is allowed to soar at the aforementioned high rate of climb with its engines still idling until it decelerates to its minimum drag speed at that attitude, and thereafter the aircraft-mounted engines are advanced in power so as to produce a thrust which will maintain minimum drag speed at the aforementioned desired high rate of climb. This places the aircraft at a maximum altitude, a minimum distance away from the airport, with a minimum amount of noise, so that it will present a minimum of undesirable perceptible noise level to communities surrounding the airport.

An inherent advantage in this form of aircraft launching is that the energy imparted to the aircraft by airport based power sources is sufficient so that should there be a failure in the aircraft-mounted engines during the launching period, the aircraft will be able to sustain flight sufficiently long to circle the airport and make a forced landing thereon.

In accordance with one embodiment of the present invention, apparatus selected from the aforementioned copending applications, or the equivalent, is utilized so as to provide a catapult-like fluid pressure launching system, in which a launching cylinder may have a length which is on the order of magnitude of between one and three miles, thereby permitting a relatively moderate acceleration rate, on the order of magnitude of between one-third and one G (gravitational acceleration). Aircraft having a gross weight of up to approximately a half-million pounds may be launched in accordance with the teachings herein. This embodiment of the invention is disclosed as being usable in conjunction with a launching apparatus return path which permits launch vehicles to return to the point of starting without being backed along the launch route. This in turn permits utilization of the same launching cylinder, and source of fluid pressure therefor, for successive launches of a sequence of aircraft by a related sequence of launching vehicles, each launch being capable of commencing as soon as the straight run launching area of the system has been cleared by a previous launch vehicle. This permits maximum utilization of the launching cylinder and powerplant, so that the cost per takeoff is mitigated in an airport which has a sufficient number of takeoffs per day. For instance, it is contemplated that one aircraft may be launched every minute, each launch vehicle taking three minutes to complete the entire pattern of the system and be available to again be used, there being one launch vehicle starting a launch at a time that another launch vehicle has begun the trip and a third launch vehicle is finalizing a return trip.

One embodiment of the invention utilizes a long tow cable, or tether, which may have a length on the order of magnitude of one thousand feet, such length permitting the aircraft being launched to exceed liftoff speed and still continue to be accelerated by the airport-based device through the medium of the long cable. In order to mitigate the problems of handling such a cable, this embodiment of the invention may be used in conjunction with a train of cable-supporting cars which prevent the cable from rubbing on the runway during the initial stages of a launch operation, and which, with suitable restraints and tethers, may recover the cable once the aircraft is released therefrom. Thus, this embodiment may incorporate the use of a piston to be impelled by fluid under pressure through the launching cylinder, a launch vehicle attached through a slot in the cylinder to the piston to be impelled thereby in turn, and a series of cable-carrying cars pulled by said launch vehicle, the launch vehicle including a long cable disposed to be carried by said cars when not displaced thereabove by the operation of the system, the cable being of suitable length to tow the aircraft both on the ground and after it achieves flight at speeds in excess of liftoff speeds.

The source of fluid under pressure which may be used to impell the piston along the launch cylinder may comprise, in accordance with the teachings of the aforementioned copending application entitled Aircraft Launching Thrust Augmentation System, a source of clean air together with burner units for expanding the volume of the air at high temperatures. As disclosed in said copending application, the source may comprise gas powered axial flow free turbines driving fans which supply clean air to burner units of the type used in jet aircraft engines, the hot air under pressure, exhausting from the burners, being used as the main impelling force for the launching system, temperatures in the neighborhood of 1000° F. being contemplated therein. The high temperature of the fluid under pressure lowers the Mach number thereof, thereby increasing the mobility of the fluid so as to mitigate problems of impelling a launch vehicle along a very long launching cylinder as contemplated herein.

The longitudinal slot in the launching cylinder may be provided with closures suitable for extremely long lengths by either utilizing the positive locking features of said copending application entitled, Integral Seal for Aircraft Launching Cylinder, or utilizing the modular structure disclosed in said copending application entitled, Modular Seal for Aircraft Launching Cylinder.

A notable difference between the present invention and the launching of aircraft by means of nonaircraft-mounted power which is known to the prior art, is that the present invention relates to launching of aircraft with a minimum of assist from the aircraft-mounted engines, over relatively long distances which approximate the normal takeoff distance for the same aircraft when operating under its own power, at acceleration rates which are within an order of magnitude of the normal acceleration rate for an aircraft when taking off under its own power. In contrast, systems of the prior art utilize nonaircraft-mounted power (typically the well-known catapult) so as to provide additional thrust to the maximum thrust achievable by the aircraft-mounted engines, whereby liftoff speed is achieved in a runway distance which is significantly less than the normal runway distance required for the same aircraft to take off under its own power alone. The purposes differ as well: the main purpose of the present invention is to achieve the launching of aircraft at maximum gross weight with a minimum of perceptible noise in the communities surrounding the airport where the launch occurs; this contrasts with the catapults of the prior art which are designed merely to minimize the distance required to achieve the launching of an aircraft.

The invention will permit a lessening of noise surrounding airports, whereby large aircraft will not be limited in payload simply because the thrust required for takeoff at the maximum gross weight results in a noise level which is in excess of that permitted at any given airport. Additionally, since the aircraft will be taking off as a result of airport based power, the fuel consumption as a result of takeoff will be minimal, thus extending the range for any given amount of initial fuel, or permitting higher payloads with less fuel for a given range of operation. The system referred to herein is sufficiently economical so that the use thereof results in substantially no cost increase over nominal takeoff costs so that substantial economic benefit may be gained by operating airlines in accordance with the teachings herein.

The foregoing and other objects, features and advantages of the present invention will become more apparent in the light of the following detailed description of preferred embodiments thereof, as illustrated in the accompanying drawing.

DESCRIPTION OF THE DRAWINGS

FIG. 3 is a chart illustrating a takeoff flight path of an aircraft in accordance with the present invention, altitude being plotted against the distance traveled by the aircraft along the runway; and FIG. 4 is a chart of aircraft speed in comparison with distance traveled along the runway, corresponding in distance with the chart of FIG. 3.

DESCRIPTION OF THE PREFERRED EMBODIMENT

The following definitions are applicable in the specification and claim hereof. It shoud be understood that the parameters referred to and defined herein are not absolute, but may vary from time to time and from takeoff to takeoff. Thus, although a given type of aircraft may have an optimum takeoff pattern, different pilots, operating in different weather conditions, with a variety of loads will necessarily cause variations in the takeoff flight path for any given type of aircraft. Similarly, aircraft of different types will necessarily have different takeoff patterns when operating under aircraft-mounted power or when operated in accordance with the present invention. Therefore, the definitions herein are in terms of, and are to be confined only to, orders of magnitude rather than specific absolute values. The examples given herein are for illustrative purposes merely.

"Normal acceleration" means the order of magnitude of acceleration rate which an aircraft will approximate in accelerating the aircraft from zero velocity on the ground to a point where the aircraft is clear of the airport and climbing to cruising altitude. For a jet transport aircraft of the intercontinental class presently available, the normal acceleration rate may approximate an order of magnitude of about two-tenths of a G (gravitational rate). For a currently planned, supersized, supersonic transport, a normal acceleration rate may approximate an order of magnitude of about 0.6 to 1.0 G.

"Normal liftoff distance" means the distance that a given aircraft will normally travel in accelerating from zero velocity to liftoff speed so as to permit the aircraft to take off. For large currently available jet aircraft, normal liftoff distance may fall in a range of between one and one-half and two miles. The normal liftoff distance for a currently planned supersonic transport may fall within the range of between one-half and one mile.

"Minimum drag speed" is defined as a speed at any given altitude at which the power losses as a result of aerodynamic factors such as friction and aerodynamic drag are at a minimum; in other words, this is the speed at which the thrust created by the engines of the aircraft is most efficiently utilized by the aerodynamics of the aircraft.

"Liftoff speed" means the velocity at which the aerodynamics of the airplace permit flight under attitude guidance from the pilot of the aircraft: when taking off under the power of its own engines, the speed of an aircraft will approximate the same order of magnitude as "liftoff speed."

"Desired climb rate," or "desired rate of climb," means a rate of climb which is within an order of magnitude of the rate of climb specified for a given aircraft so as to facilitate the flight path which conforms with regulations appertaining to that particular aircraft.

Figure 1:
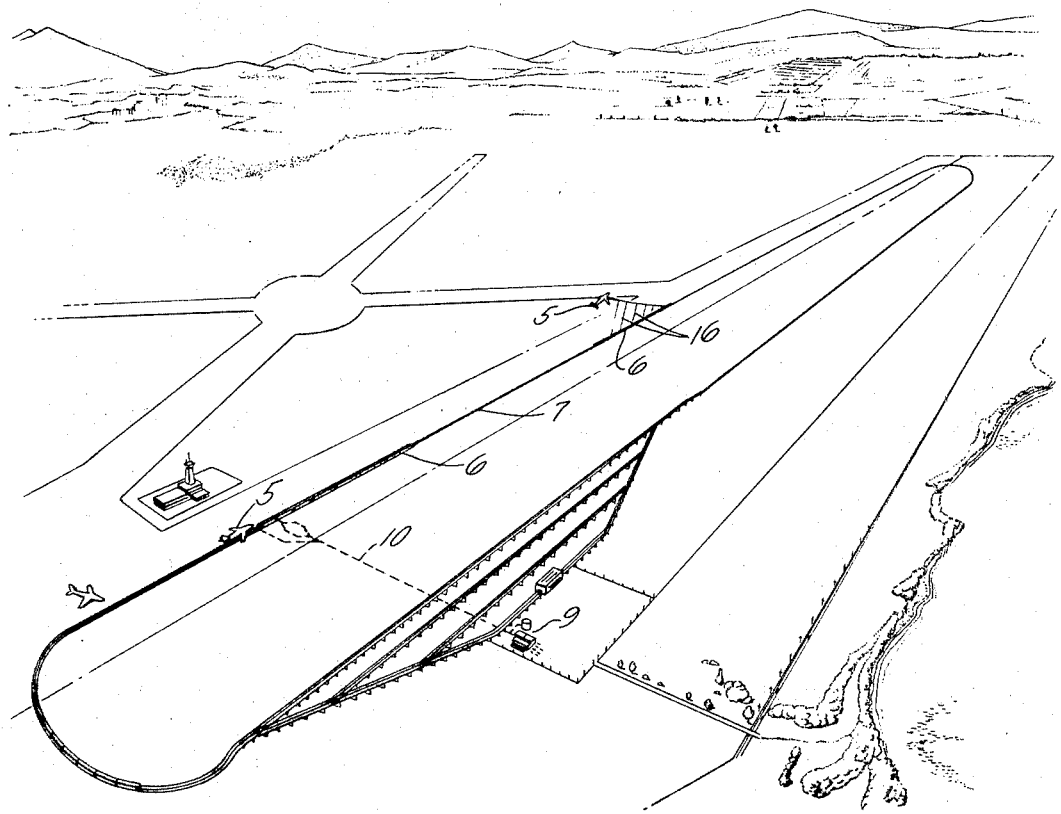
FIG. 1 is a perspective illustration of an airport capable of launching aircraft in accordance with the teachings of the present invention.
Figure 2:
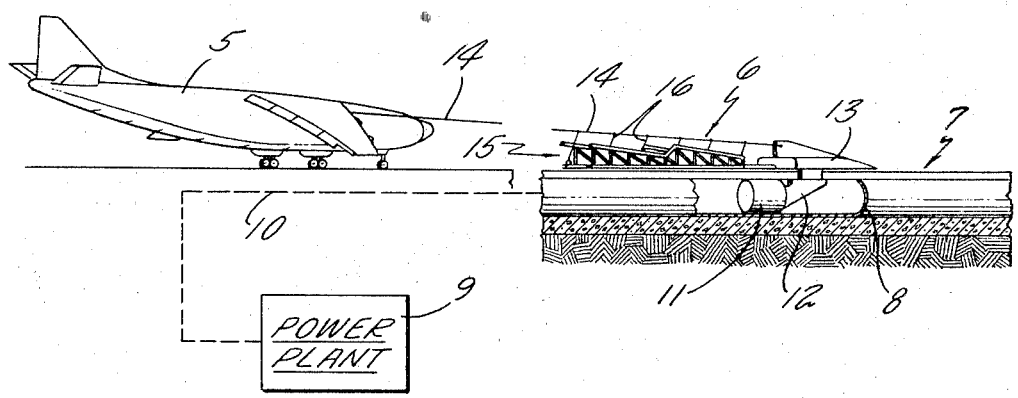
FIG. 2 is a detailed perspective illustrating launching apparatus suitable for use in the airport of FIG. 1.

Referring now to FIGURES 1 and 2, an aircraft 5 is depicted being towed on the ground and in the air by an aircraft launching mechanism 6 along a runway 7 which may be two miles long. The runway 7 is provided with a subterranean launching cylinder 8 which is supplied with fluid under pressure from a powerplant 9 via fluid communication means 10. Within the launching cylinder 8 is disposed a piston 11 which is impelled therethrough by fluid pressure. The cylinder 11 is connected by structural means 12 to a launching cart 13 to which is connected a tow cable 14 and a plurality of cable-carrying cars 15. The tow cable 14 may be oriented relative to the cable-carrying cars 15 by means of a plurality of tethers 16. Although not depicted in detail in FIGURES 1 and 2, the launch cylinder 8 may preferably have an elongated slot extending longitudinally of the top thereof, which slot permits the structural member 12 to pass along the cylinder 8 as the piston 11 is impelled therethrough. Also not shown is a seal for sealing off the slot in the cylinder 8 behind the piston 11 so as to maintain fluid pressure within the cylinder 8 for impelling the piston 11. The powerplant, cylinder, piston, seal and cart may take the form illustrated in the aforementioned applications.

For example, consider the launching of an aircraft having a gross weight of about half a million pounds (such as is currently being planned for supersonic transport). If the aircraft is to be accelerated at an acceleration equal to the gravitational acceleration (1.0 G) so as to achieve a maximum velocity of 325 knots before being released from the system, a thrust of about 500,000 pounds is required. In addition, the cylinder and cart assembly, cable and cable-carrying cars must also be accelerated at the same rate as the desired acceleration rate of the aircraft. This will also require thrust so that a total thrust in excess of 500,000 pounds will be required in order to achieve the desired acceleration rate. Assuming that the exemplary aircraft is fitted with four engines, each capable of delivering on the order of 65,000 pounds of thrust, the engines, when idling for minimum noise during launching, may contribute something in the neighborhood of 20,000 pounds of thrust to the total thrust which is reqired. This 20,000 pounds is small compared with the 500,000 pounds required to accelerate the mass of the aircraft. In order to achieve this, it is possible to use a launching piston and cylinder having roughly an eight-foot diameter so that the desired thrust may be achieved with 65 or 70 pounds per square inch pressure. A suitable volume of air at this pressure may be achieved by a powerplant capable of delivering a quantity of air comprising 54,000 pounds thereof at about 1000° F. This may be achieved in turn at the output of burners which burn jet aircraft fuel at the rate of 16 pounds per second over a period of 17 seconds, said burners being supplied clean air at the rate of approximately 1,540 pounds per second for 17 seconds. This may be achieved by utilizing an air accumulator on the order of 66 feet in diameter and 33 feet high (according to the aforementioned Tyler et al. application) which in turn is fed by gas powered axial flow free turbines driving fans, the fans delivering a constant 900 pounds of air per second to the accumulator.

A launching of an aircraft according to the preceding detailed example is illustrated in FIG. 3. The aircraft 5 is shown in five different positions, which are as follows:

The aircraft is started with zero velocity with the piston located 1000 feet downstream therefrom, attached thereto by the tow cable.

Liftoff: at about 1100 feet, the aircraft will achieve a speed of 160 knots, which is sufficient for it to assume flight under attitude control by the pilot. This takes place approximately 9 seconds after the plane first starts to move.

Achieve acceleration altitude: at about 2100 feet down the runway from its starting position, the aircraft will have climbed to an altitude of about 200 feet and will have achieved a speed of approximately 220 knots. This occurs approximately 12 seconds after the aircraft starts to move. At this altitude, the aircraft continues to be accelerated by the launching mechanism while still under tow, with its engines idling.

Release: The tow cable is released from the aircraft at a point on the runway approximately 4700 feet from the point where the aircraft starts to move, having been accelerated while in flight to a speed of about 325 knots, 17 seconds after the aircraft started to move. It will thereafter convert the kinetic energy of its speed into potential energy at a higher altitude and a lesser speed by gliding upwardly at a relatively steep rate of climb.

Assume engine-driven flight: At about 12,000 feet from the point of beginning, the aircraft will have glided at a steep rate of climb to an altitude of approximately 2200 feet, achieving a minimum drag speed of approximately 225 knots. This takes place approximately 25 seconds after the aircraft is started down the runway. At this point, the aircraft's engines are advanced in power so as to obtain a thrust which will permit maintaining this desired rate of climb at the current, minimum drag speed so as to rapidly achieve altitude, thereby mitigating the noise resulting therefrom which is perceptible in surrounding communities on the ground.

The speed which the aircraft achieves is shown in FIG. 4 for the foregoing example, a maximum speed of 325 knots is obtained. Thereafter, as the aircraft climbs steeply with its engines still idling, the speed decreases to about 225 knots. Once the aircraft engines are cut-in, the minimum drag speed (approximately 225 knots) is maintained thereafter so as to achieve maximum climb with a minimum amount of thrust to thereby mitigate noise perception on the ground.

Shown in FIG. 3 in dotted fashion is an approximate takeoff pattern for a similar aircraft (having a gross weight in the neighborhood of 500,000 pounds, with engines capable of delivering about 260,000 pounds of thrust), which will assume an acceleration rate in the neighborhood of 0.2 G, and will maintain this acceleration over the entire distance depicted in FIG. 3, whereby it climbs at a more regular rate and achieves a much lower altitude, about 400 feet. The significant difference, and the point to which the present invention is directed, is that in the normal engine-driven aircraft launch, the flight path of which is depicted by the dotted line in FIG. 3, the aircraft engines will be making maximum noise from the starting position all the way to the end of the distance referred to in FIG. 3. Since it is much closer to ground, the effect of noise on the community is greater.

By comparing dotted configuration for the normal engine-driven takeoff with that in accordance with the present invention (FIG. 3), it can be seen that the takeoff pattern is very similar in terms of the overall distance required for the aircraft to take off, the acceleration rates which will be felt by passengers of the aircraft, and the speeds and altitudes obtainable. The major difference is that launching of the aircraft in accordance with the present invention with the engines idling results in minimum noise (the noise being confined within the airport powerplant 9, FIG. 1) rather than being scattered above the surrounding communities, and a high altitude is reached sooner because of the greater thrust.

Although the invention has been shown and described with respect to a preferred embodiment thereof, it should be understood by those skilled in the art that various changes and omissions in the form and detail thereof may be made therein without departing from the spirit and scope of the invention.

Having thus described the preferred embodiment of my invention, what I claim as new and desire to secure by Letters Patent of the United States is:

1. The method of launching an aircraft with its engines idling which comprises accelerating the aircraft to a speed in excess of lift-off by means of a tow cable attached to a ground powered towing vehicle, and accelerating the aircraft while in flight by means of said towing vehicle to a given speed, in excess of the minimum drag speed for said aircraft; releasing said aircraft from said towing vehicle, said aircraft thereafter soaring upwardly at a high rate of climb until the speed of the aircraft decreases to said minimum drag speed; and thereafter advancing the power of the engines on the aircraft from idling to a thrust which is sufficient to maintain said high rate of climb at said minimum drag speed.

References Cited

UNITED STATES PATENTS

| 834,658 | 10/1906 | Chanute | 244—63 |
| 2,659,553 | 11/1953 | Wallis | 244—63 |

FOREIGN PATENTS

| 797,798 | 2/1936 | France. |
| 506,680 | 6/1939 | Great Britain. |
| 615,917 | 1/1959 | U.S.S.R. |

MILTON BUCHLER, *Primary Examiner.*

P. E. SAUBERER, *Assistant Examiner.*

U.S. Cl. X.R.

244—3